Sept. 26, 1967  J. H. SEXSTONE  3,343,462
MULTIPLE FILTER MAKING MACHINE
Filed July 3, 1964  3 Sheets-Sheet 3

INVENTOR
JOHN H. SEXSTONE
BY Kane, Dalsimer & Kane
ATTORNEYS

United States Patent Office 3,343,462
Patented Sept. 26, 1967

3,343,462
MULTIPLE FILTER MAKING MACHINE
John H. Sexstone, Louisville, Ky., assignor to Brown & Williamson Tobacco Corporation, Louisville, Ky., a corporation of Delaware
Filed July 3, 1964, Ser. No. 380,145
10 Claims. (Cl. 93—1)

This invention relates generally to the manufacture of multiple filters having a charcoal granule section and, more particularly, to the adaptation of commercially available apparatus to this manufacture.

The use of charcoal of the activated type in granule form in cigarette filters has increased significantly because of its superior filtering properties. Special machinery for the manufacture of multiple filters in which one section thereof is composed entirely of loose charcoal granules would obviously be expensive and it would be most economical to adapt available machinery to such purposes.

Accordingly, a principal object of this invention is to provide a simple technique for manufacturing multiple filters having a charcoal granule section as well as a filter of this nature having increased and better fill of charcoal granules compared with heretofore proposed filters having a charcoal section.

Another important object is to modify and adapt an existing multiple filter machine to the manufacture of filters having a charcoal granule section; and, specifically, this invention provides for the modification of a multiple filter making machine for such purposes that is known in the industry as Molins D.A.P.T.C. Machine disclosed in U.S. Patent No. 2,957,285 of Oct. 25, 1960.

Generally speaking, the Molins D.A.P.T.C. Machine operates in the following manner in producing a filter rod eventually cut into individual filter lengths by a cigarette making machine and filter tip attachment combination well-known in the field, having a material A section and a material B section or, in other words, a dual filter. A hopper forming part of the machine is adapted to feed sections of filter plug material onto a suction tape. The speed of this suction tape is such that a space or gap is obtained between the material A filter plug sections. A second filter hopper also forming part of this machine is used to feed filter plug sections of material B; and this section is placed in the gap between the two sections of material A. Downstream from the filter hoppers, a closing device crams the sections of filter plugs into a continuous rod of material A/material B formation. This rod is wrapped in paper, sealed and cut to desired lengths. These cut lengths of filter rod material A/material B formation are then fed to a making machine and filter tip attachment combination to produce a cigarette.

In accordance with the teachings of this invention, mechanism is coupled with the downstream end of the composite cigarette-mouthpiece rod making apparatus. The rod forming apparatus embraces filter plug feed control band arrangement geared to an increased speed, whereby a gap of predetermined size will be obtained between filter sections. A the same time, as the filter plug sections are fed to the receiving tape, a thermoplastic coated paper wrapping will be fed onto the receiving tape; and the sections of filter plug will rest thereon. Immediately before the location at which the paper enters the receiving tape, heat will be applied to the center of the paper, thereby activating the thermoplastic coating which, in turn, will retain the filter plug sections to the desired spacing. A further embodiment contemplated by this invention will eliminate the need of thermoplastic wrapping and, instead, will employ other accepted wrappings of filters. In this connection, the filter plug will be suitably tacked at the desired spacing as, for example, by means of a suitably applied adhesive.

The wrapping will then be formed to a U section and charcoal granules will be fed, or otherwise suitably dispensed to the gap between filter plug sections. In accordance with exemplary embodiment disclosed herein, the semi-wrapped filter rod will pass beneath a hopper of charcoal granules at which station granules will fall to fill the intervening gaps between filter plug sections. The charcoal in this hopper will be suitably maintained at a desired level to assure proper feed of the charcoal granules. Excessive and undesired charcoal will thereafter be removed from the rod which will then pass through a final forming tongue and then a seam pasting station and, subsequently, locating heating station. The rod is then cut at prescribed points to form cut lengths of filter rod of material A, charcoal granule section and material B formation.

Other objects and advantages will become apparent from the following detailed description which is to be taken in conjunction with the accompanying drawings illustrating a preferred exemplary embodiment in which.

Figure 1:
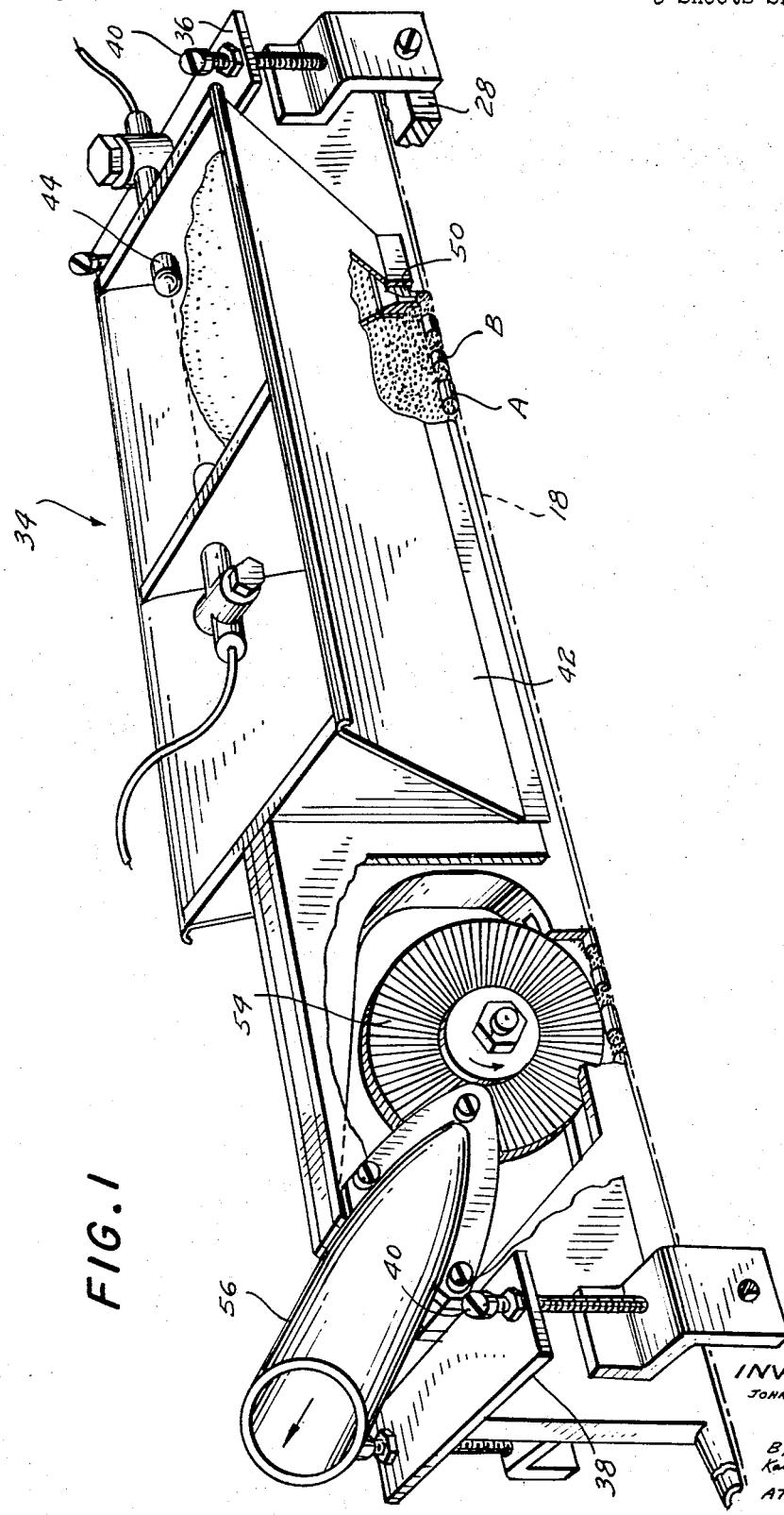
FIG. 1 is a perspective view of the charcoal granule attachment coupled with the trailing end of a filter making machine of the type commercially known as Molins D.A.P.T.C. Machine supplied by Molins Machine Co., Ltd. of London, England.
Figure 2:
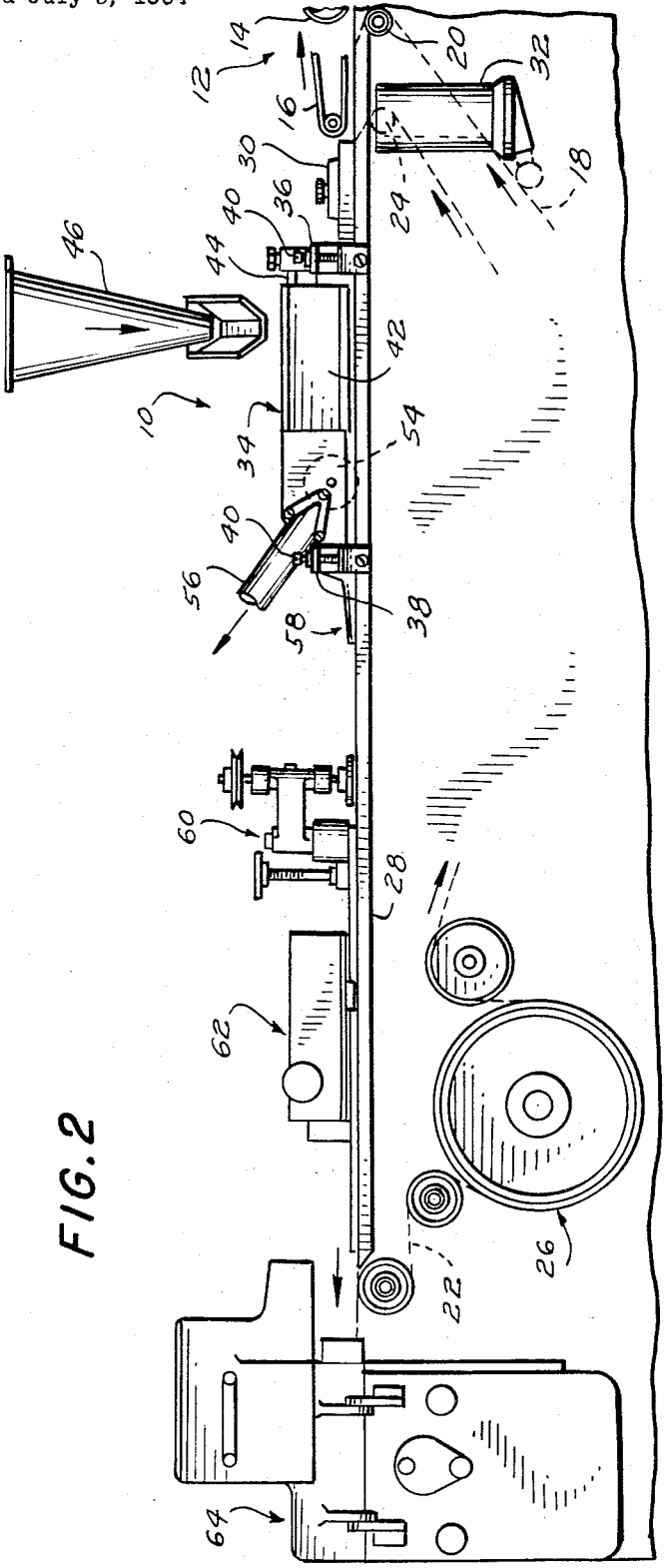
FIG. 2 is a side elevation view thereof.
Figure 3:
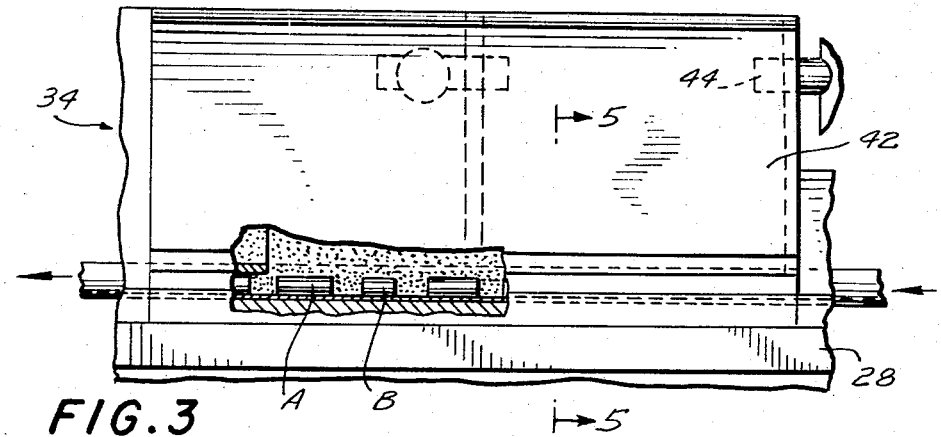
FIG. 3 is an enlarged fragmentary side elevational view of the charcoal granule dispensing station with certain parts broken away and removed.
Figure 4:
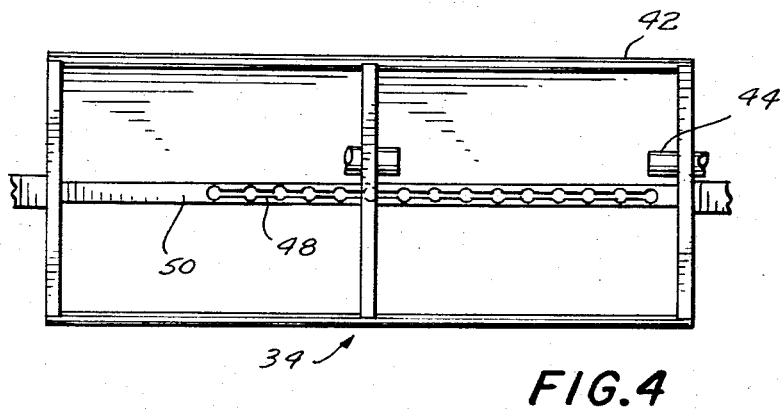
FIG. 4 is a top plan view of the charcoal granule dispensing station.

In the drawings, a charcoal granule attachment or modification 10 is shown associated with the trailing end of the above identified filter rod making machine 12. As will be appreciated by those skilled in the art, and as will be evident from the above identified Patent No. 2,957,285, this commercially available machine includes two hoppers for mouthpiece components consisting of plug lengths made of paper, cellulose, cotton or other selected material.

Each hopper is provided with feeding devices which are substantially identical with respect to one another. An individual feeding device comprising a drum having flutes on its periphery is disposed at the bottom of the associated hopper and is positioned to receive plug lengths in the flutes. The drum is provided with a number of circumferentially extending grooves into which rotating disc knives extend so as to subdivide each plug length into smaller separate individual lengths. An endless chain conveyor having pusher pieces is disposed beneath the drum so that as the drum rotates the pusher piece enters a flute so as to remove the cut plug lengths in a substantial continuous line. A guide associated with the trailing end of the chain conveyor serves to elevate the individual plug lengths at which point a rotatable disk also provided with pushers is adapted to feed the raised plug length in an arcuate path onto a perforated suction conveyor band. The band picks up these plug lengths and retains them in place through the operation of the applied suction. This conveyor band is also timed with the pusher disk associated with the second hopper so that plug lengths delivered from this hopper enters the spaces between successive plug lengths carried to and disposed on the conveyor from the feeding device associated with the first hopper. Following the intermeshing or interdigitating of the individual plug lengths, they are arranged in substantially preset spaced relationship before passing through the charcoal attachment.

At this stage, the charcoal attachment machine of this invention is advantageously incorporated into the filter making machine. In this connection, the garniture section of the filter making machine is extended to accommodate the charcoal dispensing mechanism 34 and associated elements. This mechanism is adapted to place charcoal granules between the individual plug sections, whereby cigarette filters may be obtained of material A, charcoal granules and material B formation. Thus, the suction conveyor 14, together with the plug control band 16 constituting the part of the composite mouthpiece machine 12 or the leading end of the charcoal dispensing attachment 10, cooperates to provide the desired spacing between the plug sections of alternate material A and material B.

The spaced plug sections are disposed on a paper web 18 which runs over a small guide roller 20. The paper web is supported and carried forwardly on a tape 22 which travels over a roller 24 and network of rollers and tape wheels 26 associated with a tape drive (not shown). The tape 22 travels in an elongated trough 28, extending a major portion along the length of the charcoal granule attachment 10.

Figure 5:
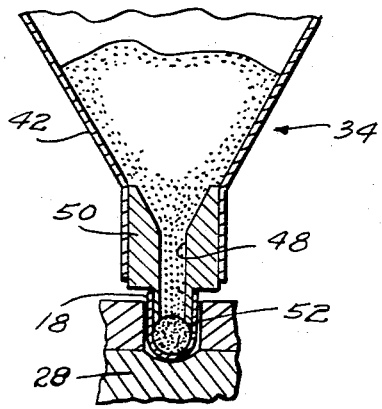
FIG. 5 is a cross sectional view taken along the line 5—5 of FIG. 3.

The tape 22, with the paper web 18, extends through a short tongue 30 the relative elevation of which is adjustable to form the paper in the tube partly around the plug lengths essentially as shown in section of FIG. 5. The plugs are retained in the desired position on the paper web 18 by one of a number of techniques. As illustrated, a plug wrap paster 32 which applies a thin strip of adhesive on the paper web 18 may be employed. In the event a thermoplastic coated wrapping material is utilized, the plug wrap paster 32 can be substituted with a heater which renders a similarly proportioned strip tacky for such purposes.

A granule dispensing mechanism 34 is positioned at the downstream end of the tongue 30. This mechanism 34 is mounted by means of a pair of spaced brackets 36 and 38. These brackets straddle the trough 28 by means of a number of strategically located adjustment screws 40 for purposes of assuring placement of the desired amount of charcoal granules between the plug sections of material A and material B. The mechanism 34 comprises a charcoal hopper 42 adapted to contain charcoal granules of specified proportion and characteristic at a predetermined level. In this connection, a photo cell device 44 of commercially available form is preferably associated with the hopper 42 to sense the level of the granules therein. When the elevation falls beneath a predetermined level, the photo cell device will trigger a charcoal feed mechanism 46, shown diagrammatically, to dispense charcoal granules into the hopper 42 to a certain level at which the feed will stop. A satisfactory mechanism 46 with photo cell 44 may be obtained commercially under the name Syntron Vibra-Flow feeder, manufactured by the Syntron Company, Homer City, Pennsylvania.

In this manner, a certain quantity of charcoal granules is assured in the hopper 42 thereby maintaining a certain pressure at the base of the hopper from which the granules are dropped into the space between filter sections. Under these circumstances, regulation of pressure will have the effect of regulating the amount of charcoal and its compactness placed between the plug sections. Thus, the charcoal at the base of the hopper 42 is adapted to be disposed in an elongated slot 48 defined by a bar 50. The upper portion of the slot 48 is divergent in an upward direction, as shown in FIG. 5, to facilitate passage of the charcoal granules therethrough. The lower edge 52 of the bar 50 is provided with a radius as shown to conform to the curvature of the plug sections traveling thereunder. Of course, sufficient clearance should be provided to permit free travel of the plug sections. The bar 50 and, specifically, the base thereof will be embraced by the marginal side edges of the paper web 18 to, accordingly, confine the path of descent of the granules and assure their disposition between the spaced plug sections.

The mechanism 34 is also provided with a powered rotary brush 54 which is adjustable in elevation and located at the downstream end of the hopper 42 to operate to clean off any surplus granules within the marginal side edges of the paper web 18 and above the plug sections. A vacuum type cleaner or collector 56 is adapted to remove the excess charcoal from the bristles of the brush.

The filter rod now composed of spaced plug sections of material A and material B, with intervening sections of charcoal granules, passes into elongated folding section 58 disposed at the downstream side of the charcoal dispensing mechanism 34. This section completes the wrapping of the marginal side edges of the paper web 18 about the filter sections.

A seam paster 60 of the usually rotary disc type applies a strip of adhesive on the inside of the upper marginal side edge of the paper web 18 to complete the wrapping of the paper web such that the overlapped side edges are adhesively secured to one another about the filter sections. The wrapped filter rod is then passed through a heater 62 which serves to set the adhesive applied by the paster 60. When thermoplastic wrapper material is utilized, a heater will be substituted for the seam paster 60 to secure the overlapping marginal side edges; and, under these circumstances, a heater similar to heater 62 will not be required.

The wrapped rod is then passed through a conventional cut-off device 64 which operates to cut the filter rods into predetermined lengths. These lengths are then subsequently placed in conventional filter-tip attachment machinery adapted to secure composite mouthpieces on cigarettes. These composite mouthpieces, according to the teachings of this invention, will include material A, charcoal granule section and material B formation.

In successful applications of this invention, filters have been produced with charcoal granule sections in which increased fill of granules was obtained compared to other available filters having a charcoal granule section. Accordingly, the filtration of the instant filter will be at an optimum compared with these other and available filters.

It should be further understood that this invention contemplates a filter formation of material A, charcoal granule section and material A arrangement.

Thus, it should be evident to those skilled in the art that a relatively simple techniques for manufacturing multiple filters in which one of the sections includes loose charcoal granules is taught by this invention. Inasmuch as commercially available and existing multiple filter making machinery is modified by the inclusion of a charcoal granule dispensing mechanism, the costs of machinery for the contemplated manufacture is held at a minimum. Although the disclosure herein has been devoted primarily to the incorporation of loose charcoal granules in filter formations, it should be understood that other loose granular adsorbents are contemplated by the invention and usable therewith. In this connection, granular alumina, silica gel and the like may be employed along with or in lieu of charcoal.

Thus, the several aforenoted objects and advantages are most effectively attained. Although a single somewhat preferred embodiment of the invention is disclosed and described in detail herein, it should be understood that this invention is in no sense limited thereby but its scope is to be determined by that of the appended claims.

I claim:

1. A method of making cigarette-mouthpiece rods divisible into individual mouthpieces having an adsorbent granule component in line with other components, said method comprising the steps of: feeding said other components endwise in line, spacing these components a predetermined distance from one another, partially enclosing them in a continuous wrapper, providing a source of adsorbent granules, passing the partially enclosed components in the wrapper beneath the source of adsorbent granules, providing direct communication between the source of adsorbent granules and the space between components, introducing adsorbent granules between the spaced components directly from the source of adsorbent granules while partially wrapped while maintaining direct communication between the source of adsorbent granules and the space between components and simultaneously regulating the amount of adsorbent granules introduced in the space by removing excess granules and simultaneously regulating the shape of the adsorbent granules in the space, then completing the enclosing of the wrapper around the spaced components and introduced adsorbent to form a continuous composite rod and then sub-dividing said continuous rod by cutting it at predetermined intervals to thereby produce rods each of which contains at least one adsorbent granule section.

2. A method of making composite cigarette-mouthpiece rods each of which comprises components of different character including adsorbent granule components, each of which is divisible into individual mouthpieces having an adsorbent granule component for cigarettes, each such mouthpiece comprising three parts, the center part of which includes the adsorbent granule component, said method comprising the steps of: feeding double length components endwise in line with components of one character alternating with certain other components, spacing these components a predetermined distance from one another, partially enclosing them in a continuous wrapper, providing a source of adsorbent granules, passing the partially enclosed components in the wrapper beneath the source of adsorbent granules, providing direct communication between the source of adsorbent granules and the space between components, introducing adsorbent granules between the spaced components directly from the source of adsorbent granules while partially wrapped while maintaining direct communication between the source of adsorbent granules and the space between components and simultaneously regulating the amount of adsorbent granules introduced in the space by removing excess granules and simultaneously regulating the shape of the adsorbent granules in the space, then completing the enclosing of the wrapper around the spaced components and introduced adsorbent to form a continuous composite rod, and then sub-divide said continuous rod by cutting it at such intervals as to cut only through components which are of a character required in that part of an individual composite mouthpiece which is to be located next to the tobacco in a mouthpiece cigarette and which is to be located at the extreme mouthpiece end of a mouthpiece cigarette with the adsorbent granule section interposed therebetween.

3. A method of making composite cigarette-mouthpiece rods each of which comprises components of different character including adsorbent granule components each of which is divisible into individual mouthpieces having an adsorbent granule component for cigarettes, each such mouthpiece comprising three parts, the center part of which includes the adsorbent granule component, said method comprising the steps of: feeding double length components endwise in line with components of one character alternating with certain other components, spacing these components a predetermined distance from one another, partially enclosing them in a continuous wrapper, providing a source of adsorbent granules, passing the partially enclosed components in the wrapper beneath the source of adsorbent granules, providing direct communication between the source of adsorbent granules and the space between components, introducing adsorbent granules between the spaced components directly from the source of adsorbent granules while partially wrapped while maintaining direct communication between the source of adsorbent granules and the space between components and simultaneously regulating the amount of adsorbent granules introduced in the space by removing excess granules and simultaneously regulating the shape of the adsorbent granules in the space, then completing the enclosing of the wrapper around the spaced components and introduced adsorbent to form a continuous composite rod, and then sub-divide said continuous rod by cutting it at predetermined intervals to thereby produce rods each of which contains at least one adsorbent granule section interposed between a component of one character and said certain other component.

4. The invention in accordance with claim 3 wherein the double length components are secured to the wrapper prior to the introduction of the adsorbent granules.

5. The invention in accordance with claim 3 wherein the compactness of the adsorbent granules in the space between the spaced components is regulated to assure predetermined fill of the granule section with adsorbent.

6. In combination with apparatus for making composite cigarette-mouthpiece rods which contain components of predetermined character and each of which rods is divisible into individual mouthpieces for cigarettes, each of said mouthpieces including two parts of said certain character, said apparatus comprising at least one feeding device for feeding the components of certain character, conveyor means associated with said feeding device for receiving and conveying said components continuously in line; means for spacing said components a predetermined distance one from the other to provide therebetween spaced gaps, means for partially enclosing the spaced components in a continuous wrapper, a source of adsorbent granules, adsorbent granule dispensing means for introducing adsorbent granules into the spaced gaps, the dispensing means including means for providing direct communication between the source of adsorbent granules and the spaced gaps, the dispensing means including means for shaping the adsorbent granules in the spaced gaps, means for completing the enclosure of the wrapper around the spaced components with interposed adsorbent granule sections to form a continuous composite rod, and cutting means to divide the continuous rod into separate rods each of which includes at least one adsorbent granule section interposed between spaced components of certain character.

7. The invention in accordance with claim 6 wherein said apparatus further includes means for adhering the components of certain character to the wrapper prior to the introduction of the adsorbent granules into the spaced gaps.

8. The invention in accordance with claim 6 wherein the adsorbent granule dispensing means includes means for removing excess granules from within the wrapper prior to the completion of the wrapping of the wrapper around the spaced components with interposed adsorbent granule sections.

9. The invention in accordance with claim 6 wherein the adsorbent granule source includes a hopper and a gravity fed dispensing opening through which charcoals are fed by gravity into the spaced gaps.

10. The invention in accordance with claim 9 wherein said hopper is provided with means for controlling the level of granules therein to thereby control the compactness of adsorbent granules in the adsorbent granule section.

References Cited

UNITED STATES PATENTS

| 2,381,505 | 8/1945 | Lindholm | 222—56 |
| 2,423,554 | 7/1947 | Davidson | 131—61 |
| 3,259,029 | 7/1966 | Hall et al. | 93—1 |

FOREIGN PATENTS

| 389,499 | 3/1933 | Great Britain. |

BERNARD STICKNEY, *Primary Examiner.*